(12) United States Patent
Brown et al.

(10) Patent No.: US 11,725,736 B2
(45) Date of Patent: Aug. 15, 2023

(54) ENVIRONMENTAL SEAL AND SHAFT SEAL

(71) Applicant: AVX Aircraft Company, Benbrook, TX (US)

(72) Inventors: Ian W. Brown, Fort Worth, TX (US); Richard F. Murray, Pantego, TX (US); Steve Lewis, Alvarado, TX (US); John Myers, Gainesville, TX (US)

(73) Assignee: AVX AIRCRAFT COMPANY, Benbrook, TX (US)

( * ) Notice: Subject to any disclaimer, the term of this patent is extended or adjusted under 35 U.S.C. 154(b) by 14 days.

(21) Appl. No.: 17/395,197

(22) Filed: Aug. 5, 2021

(65) Prior Publication Data

US 2022/0042601 A1    Feb. 10, 2022

Related U.S. Application Data

(60) Provisional application No. 63/061,412, filed on Aug. 5, 2020.

(51) Int. Cl.
  *F16J 15/3288*    (2016.01)

(52) U.S. Cl.
  CPC .................. *F16J 15/3288* (2013.01)

(58) Field of Classification Search
  CPC .... F16J 15/00; F16J 15/16; F16J 15/50; F16J 15/52; F16J 15/32; F16J 15/3204; F16J 15/3268; F16J 15/3276; F16J 15/3288; F16J 15/30
  USPC ......................................... 277/355
  See application file for complete search history.

(56) References Cited

U.S. PATENT DOCUMENTS

| | | | |
|---|---|---|---|
| 2008/0226440 A1* | 9/2008 | Therrien | F04D 29/126 415/109 |
| 2020/0080641 A1* | 3/2020 | Shimasaki | F04D 29/063 |

\* cited by examiner

*Primary Examiner* — Nathan Cumar
(74) *Attorney, Agent, or Firm* — Greenberg Traurig, LLP

(57) ABSTRACT

Embodiments of an environmental barrier and seal include physical shields to protect against mechanical damage, labyrinth features to inhibit fluid/particle intrusion, impeller features, and a brush seal. Combinations of these features are presented in various embodiments, specific to particular operating conditions, to create an environmental barrier that protects primary carbon face seals and other shaft seals.

8 Claims, 8 Drawing Sheets

ENVIRONMENTAL SEAL AND SHAFT SEAL

CROSS-REFERENCE TO RELATED APPLICATION(S)

This application claims the benefit of and priority to U.S. Provisional Application No. 63/061,412, filed Aug. 5, 2020, entitled ENVIRONMENTAL SEAL AND SHAFT SEAL, the disclosure of which is incorporated herein by reference in its entirety.

BACKGROUND

Carbon face seals are an excellent solution to meet maximum oil leakage rate requirements for fugitive emission of gearbox oil. Unfortunately, multi-industry experience reveals that fewer than 15% of carbon face seals achieve full design limit life by completely wearing down the sacrificial carbon face. The vast majority fail, i.e. leak, due to either opening a gap between the seal faces or physical damage. Close dimensional control, tight dimensional tolerances, and good installation procedures associated with advanced aircraft transmission designs mitigate the risks inducive to seal face opening. Premature failures of greater than 85% of installations is almost always due to physical damage from to myriad causes like preinstallation handling, maintenance-induced damage, general FOD to include dirt and other abrasive materials, or perhaps most common of all causes, corrosion.

What is needed is a unique environmental barrier and seal to protect rotary shaft seals, such as carbon face seals, from physical damage and prevent foreign object debris such as water and other liquids, oil, sand, dust, particulates, and other abrasive materials from contacting the rotary shaft seals. Such an environmental barrier and seal should extend the life of the seals that are being protected and increase the efficacy of these protected seals.

SUMMARY

This Summary is provided to introduce a selection of concepts in a simplified form that are further described below in the Detailed Description. This Summary, and the foregoing Background, is not intended to identify key aspects or essential aspects of the claimed subject matter. Moreover, this Summary is not intended for use as an aid in determining the scope of the claimed subject matter.

Environmental barriers and seals are presented herein that may be used to protect rotary shaft seals in various aircraft applications. Embodiments of the environmental barriers and seals include one or more of: physical shields to protect against mechanical damage; labyrinth features to inhibit fluid/particle intrusion; impeller features imparting the benefits of centrifugal particle separators; and a brush seal as a final-stage barrier. Particular embodiments of the environmental barrier and seal include combinations of these structural features, tailored to specific operating conditions and particular installations to create an environmental barrier that protects the primary carbon face seal and other shaft seals from common hazards to effective sealing.

These and other aspects of the present system and method will be apparent after consideration of the Detailed Description and Figures herein. It is to be understood, however, that the scope of the invention shall be determined by the claims as issued and not by whether given subject matter addresses any or all issues noted in the Background or includes any features or aspects recited in this Summary.

DRAWINGS

Non-limiting and non-exhaustive embodiments of the present invention, including the preferred embodiment, are described with reference to the following figures, wherein like reference numerals refer to like parts throughout the various views unless otherwise specified.

DETAILED DESCRIPTION

Figure 1:
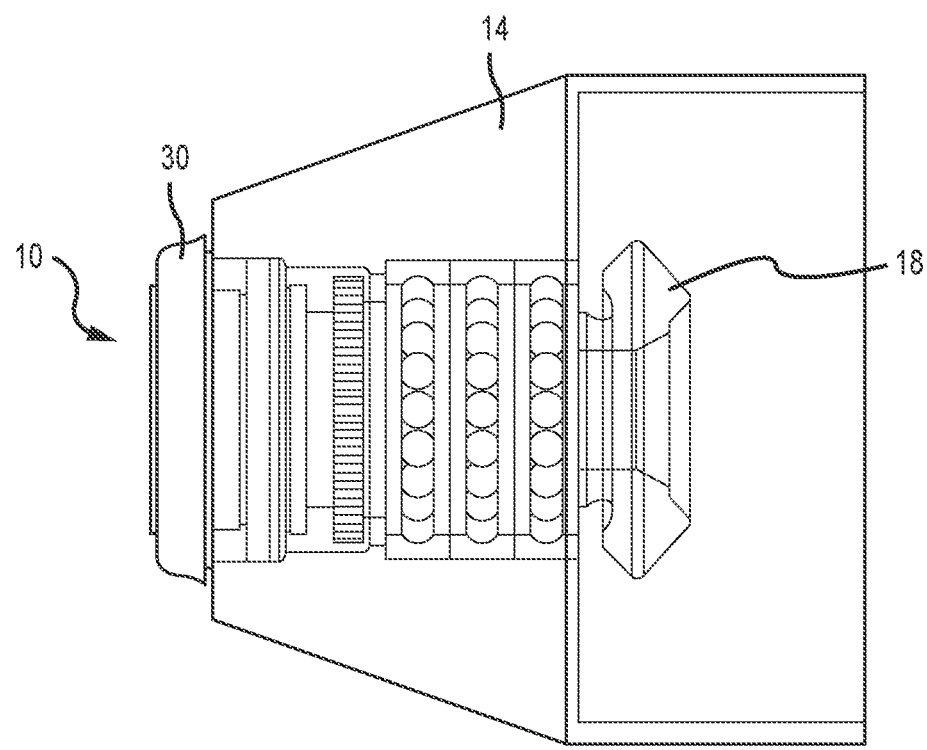
FIG. 1 depicts a side elevation view of one embodiment of the environmental barrier and seal of the present technology as the same may be used with a common shaft and housing arrangement.
Figure 2:
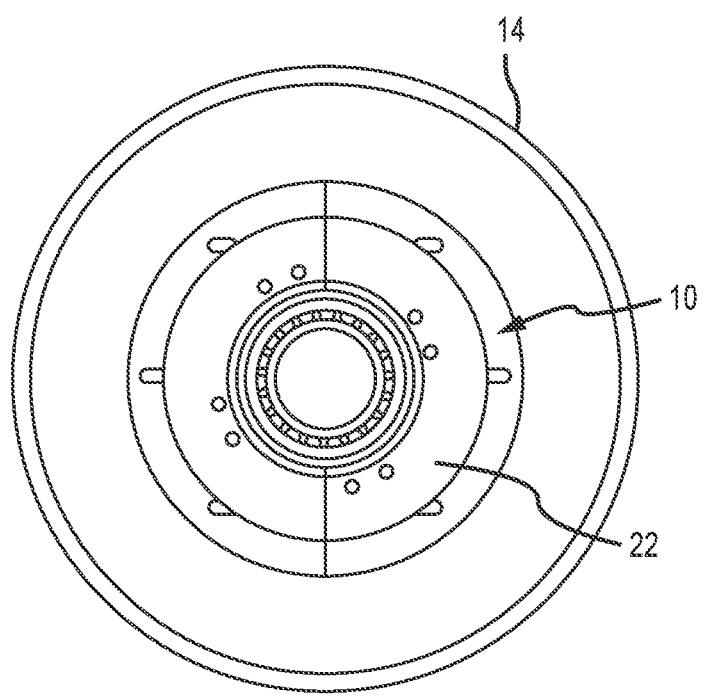
FIG. 2 depicts a front elevation view of the environmental barrier and seal depicted in FIG. 1.
Figure 3:
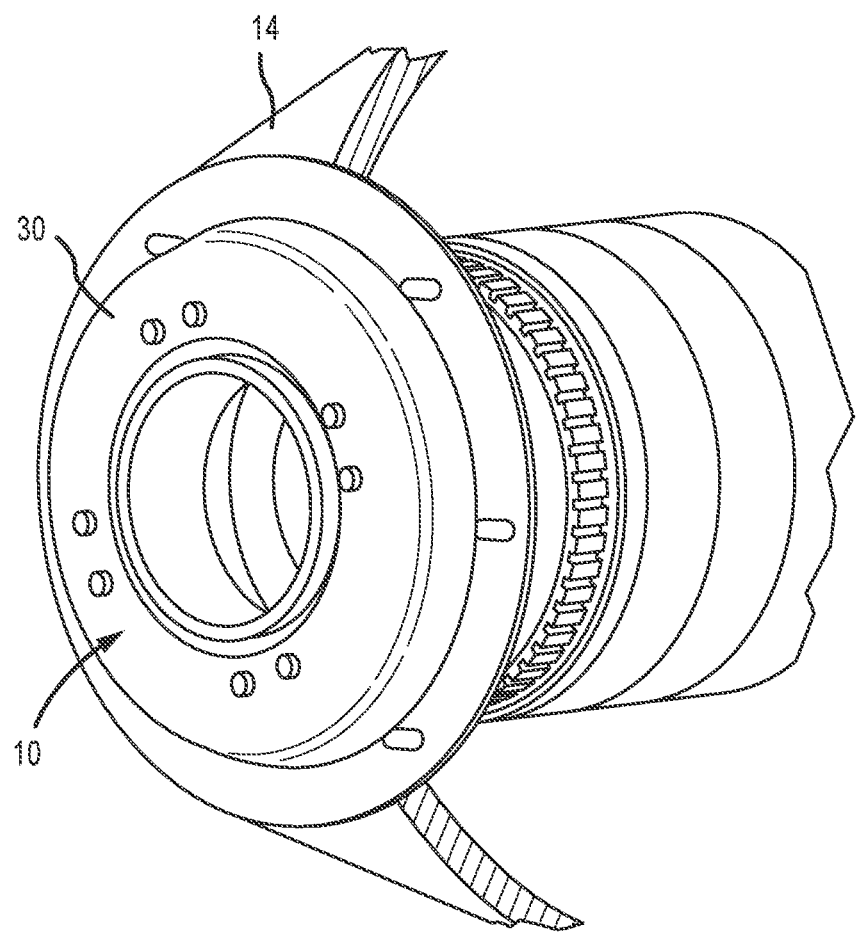
FIG. 3 depicts a front perspective view of the environmental barrier and seal depicted in FIG. 1.

Embodiments are described more fully below with reference to the accompanying figures, which form a part hereof and show, by way of illustration, specific exemplary embodiments. These embodiments are disclosed in sufficient detail to enable those skilled in the art to practice the invention. However, embodiments may be implemented in many different forms and should not be construed as being limited to the embodiments set forth herein. The following detailed description is, therefore, not to be taken in a limiting sense.

With reference to FIGS. 1-8, embodiments of an environmental barrier and seal 10 are presented to protect primary rotary shaft seals 12, such as carbon face seals, from physical damage and prevent foreign object debris such as water and other liquids, oil, sand, dust, particulates, and other abrasive materials from contacting primary rotary shaft seals 12. The environmental barriers and seals 10 of the present technology function to extend the life of the primary rotary shaft seals 12 and increase their efficacy.

The environmental barrier and seal 10 of the present technology incorporate one or more physical shields to protect against mechanical damage. In particular embodiments, labyrinth features inhibit fluid/particle intrusion. In some embodiments, impeller features impart the benefits of centrifugal particle separators. In still other embodiments, a brush seal is employed as a final-stage barrier. Bespoke combinations of these feature options tailored to specific operating conditions for each installation create an environmental barrier that protects the primary rotary shaft seal 12 and other shaft seals from the most common hazards to effective sealing.

With reference to FIGS. 1-4, one embodiment of an environmental barrier and seal 10 are depicted as the same may be used with a common shaft and housing arrangement. In particular, a generic representation of a housing 14, ball-bearing assembly 16, and gear and shaft installation 18 with a primary rotary shaft seal 12 are depicted in association with the environmental barrier and seal 10. The housing 14, gear and rotating shaft installation 18, ball-bearing assembly 16, washer, shaft cap, and locking nut 20 are depicted generically for purposes of demonstrating one possible use of the environmental barrier and seal 10 and are not meant to be limiting in the potential applications of the environmental barrier and seal 10 of the present technology.

Figure 4:
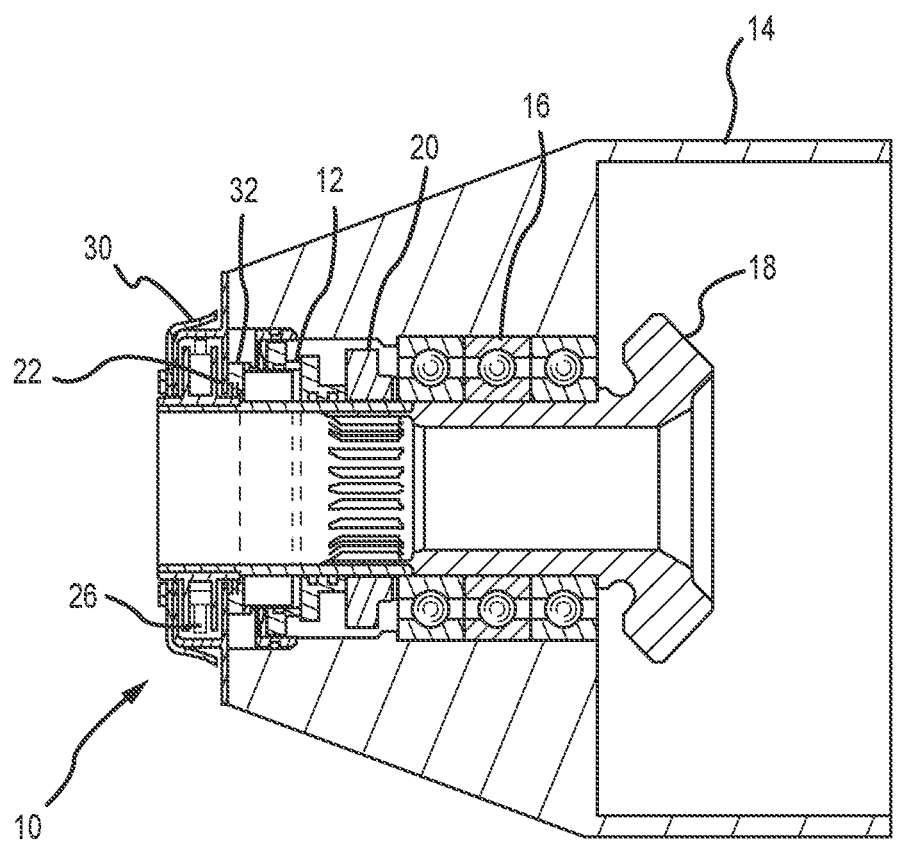
FIG. 4 depicts a cut-away, side elevation view of the environmental barrier and seal depicted in FIG. 1.
Figure 5:
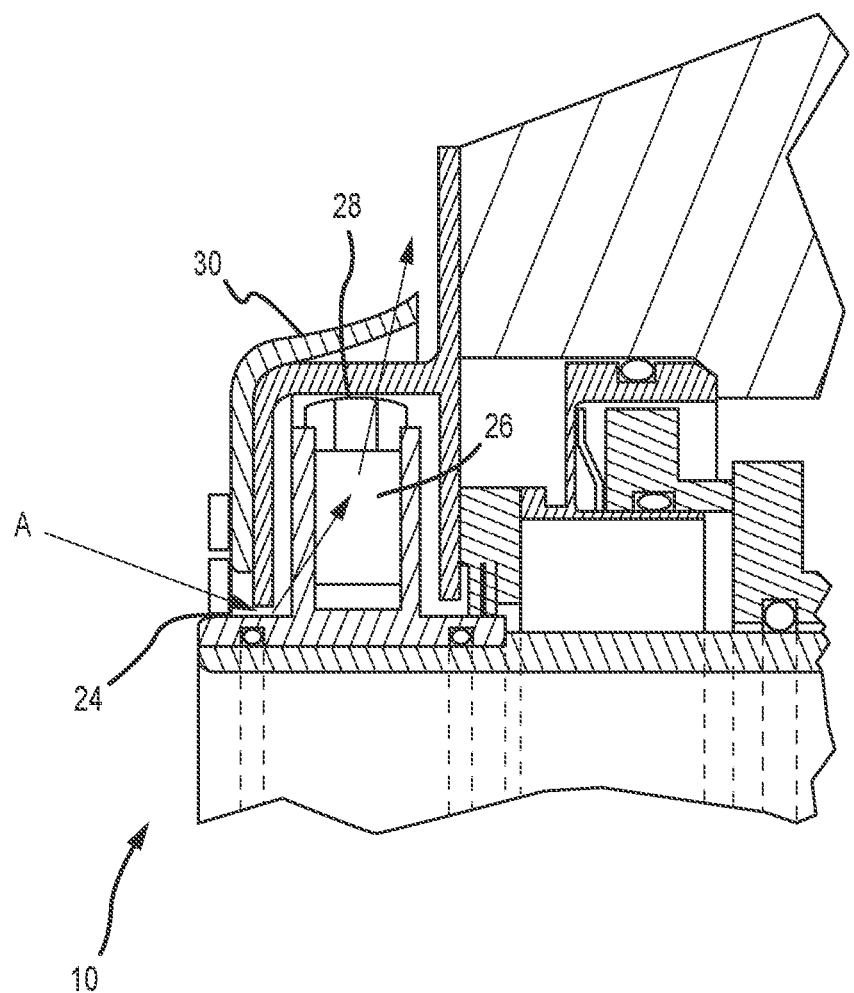
FIG. 5 depicts a partial, isometric view of the environmental barrier and seal depicted in FIG. 4.
Figure 6:
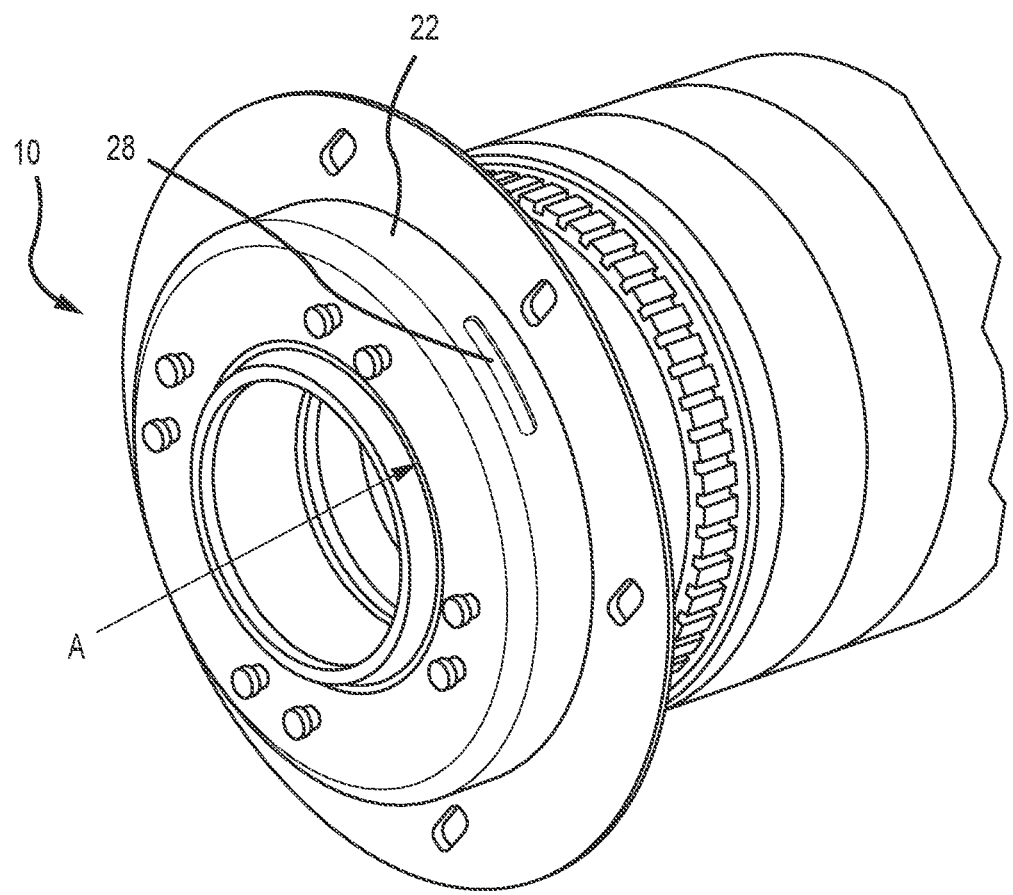
FIG. 6 depicts one embodiment of an impeller housing, with exhaust slots formed in the impeller housing, according to the present technology.
Figure 7:
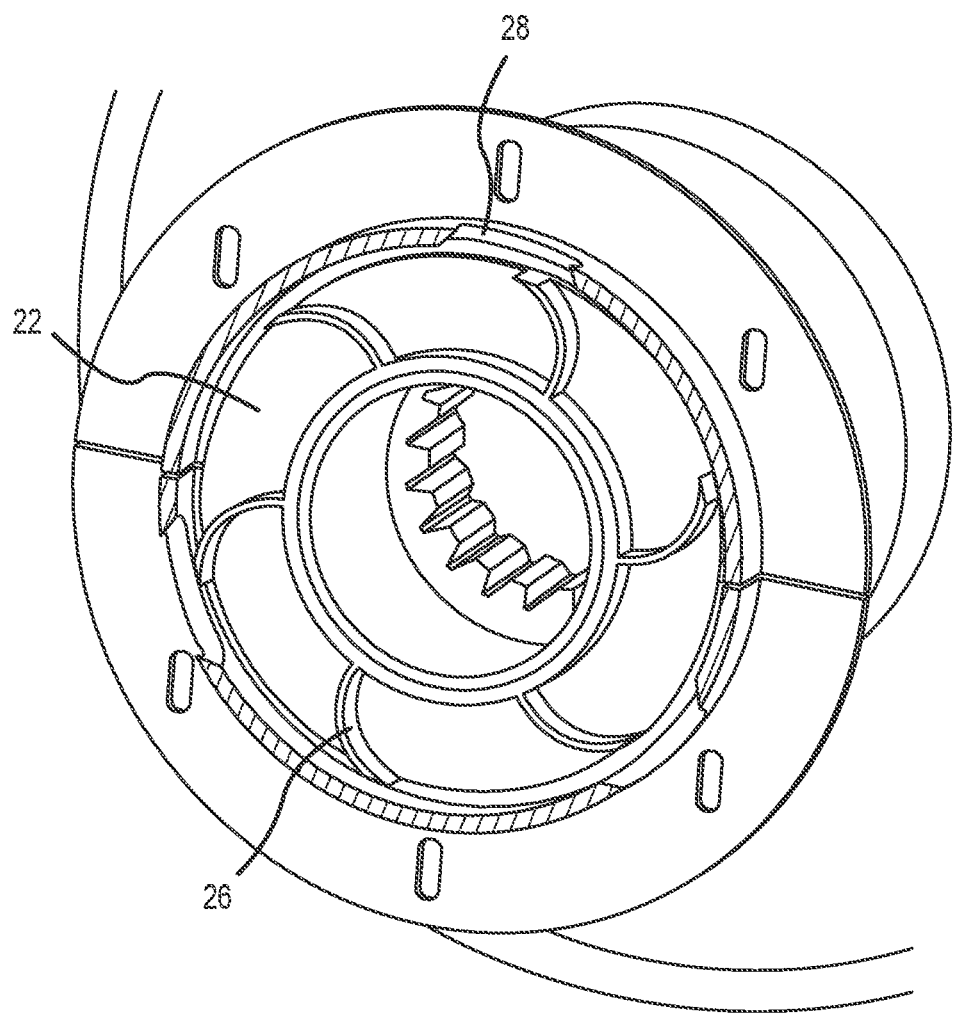
FIG. 7 depicts a cross-sectional view of an impeller according to the present technology.

With reference to FIG. 5, an isometric view of the cross-section shown in FIG. 4 is depicted. The depicted embodiment of the environmental barrier and seal 10 include an impeller 22, operatively, rotatably coupled with a forward end portion of the gear and rotating shaft installation 18, forward from one or more primary rotary shaft seals 12. In at least some embodiments, a pair of O-ring seals 23 are disposed between the impeller 22 and the rotating shaft installation 18, adjacent opposite end portions of the impeller 22. The impeller 22 has one or more slots 24 that receive incoming air, which is directed along a pathway "A" by one or more curvilinear impeller features 26, radially disposed along the impeller 22, to one or more radial exit ports 28 that are positioned along a radial periphery of the impeller 22. In particular embodiments, the impeller 22 is configured to direct the incoming air along the pathway "A" to the radial exit ports 28 with sufficient force to blow debris away from the primary rotary shaft seal. Centrifugal force is generated by the curvilinear impeller features 26 through the operative coupling of the impeller 22 with the gear and rotating shaft installation 18. An exterior debris shield 30 at least partially covers a forward end portion of the impeller 22 to further protect the system from debris. The debris shield 30 is operatively, removably coupled with the environmental barrier and seal 10 and the impeller 22 to provide maintenance access to the impeller 22 and other aspects of the environmental barrier and seal 10. FIG. 6 depicts one embodiment of an exhaust port 28 in the impeller housing 14 and an air pathway "A" that flows past the exterior debris shield 30, into the impeller 22, and exits a radial exit port 28. FIG. 7 depicts a cross-section of the impeller 22 of FIG. 6 to better depict one embodiment of the curvilinear impeller features 26.

Figure 8:
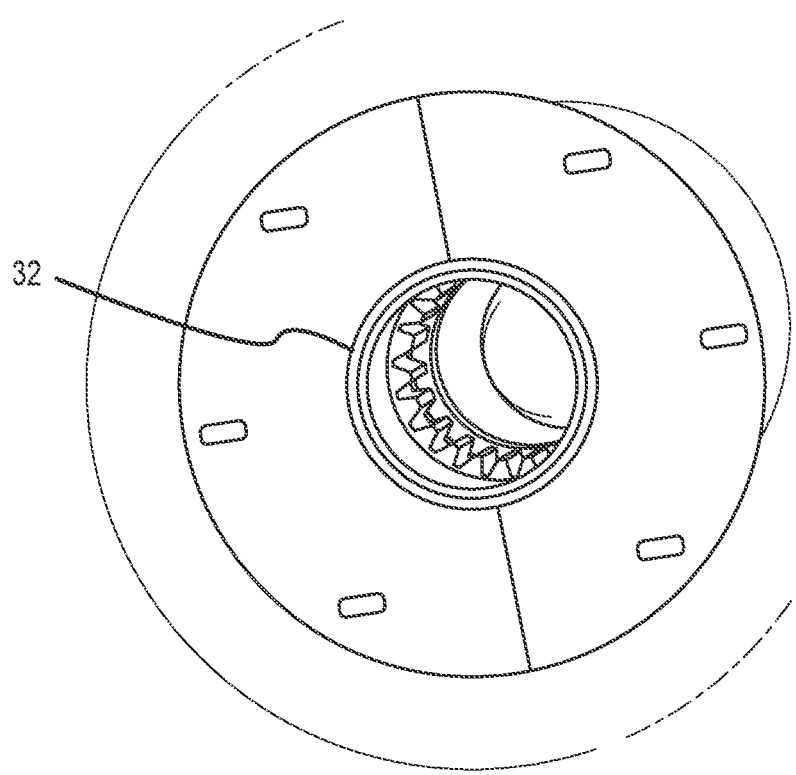
FIG. 8 depicts a cross-sectional view of one embodiment of a brush seal according to the present technology.

With reference to FIG. 8, one embodiment of a brush seal 32 is depicted as being operatively coupled with the environmental barrier and seal 10 in a cross-section view. In particular applications, the brush seal 32 is coupled with a forward end portion of the gear and rotating shaft installation 18, forward from one or more primary rotary shaft seals 12 but rearwardly from the impeller 22. In such applications, the brush seal 32 functions as the last line of defense against foreign object debris ingress into the system.

Although the technology been described in language that is specific to certain structures, materials, and methodological steps, it is to be understood that the invention defined in the appended claims is not necessarily limited to the specific structures, materials, and/or steps described. Rather, the specific aspects and steps are described as forms of implementing the claimed invention. Since many embodiments of the invention can be practiced without departing from the spirit and scope of the invention, the invention resides in the claims hereinafter appended. Unless otherwise indicated, all numbers or expressions, such as those expressing dimensions, physical characteristics, etc. used in the specification (other than the claims) are understood as modified in all instances by the term "approximately." At the very least, and not as an attempt to limit the application of the doctrine of equivalents to the claims, each numerical parameter recited in the specification or claims which is modified by the term "approximately" should at least be construed in light of the number of recited significant digits and by applying ordinary rounding techniques. Moreover, all ranges disclosed herein are to be understood to encompass and provide support for claims that recite any and all subranges or any and all individual values subsumed therein. For example, a stated range of 1 to 10 should be considered to include and provide support for claims that recite any and all subranges or individual values that are between and/or inclusive of the minimum value of 1 and the maximum value of 10; that is, all subranges beginning with a minimum value of 1 or more and ending with a maximum value of 10 or less (e.g., 5.5 to 10, 2.34 to 3.56, and so forth) or any values from 1 to 10 (e.g., 3, 5.8, 9.9994, and so forth).

What is claimed is:

1. An environmental barrier and seal for a system incorporating a primary rotary shaft seal associated with a rotating shaft installation, the environmental barrier and seal comprising:

an impeller, operatively, rotatably coupled with a forward end portion of the rotating shaft installation, forward from the primary rotary shaft seal; the impeller having slots positioned to receive incoming air; the impeller being configured to direct incoming air along a pathway to one or more radial exit ports that are positioned along a radial periphery of an impeller housing to blow debris away from the primary rotary shaft seal directly through the one or more radial exit ports to an ambient environment, exterior to the system.

2. The environmental barrier and seal of claim 1 wherein:

centrifugal force is generated by curvilinear impeller features, radially disposed along the impeller, through the operative coupling of the impeller with the rotating shaft.

3. The environmental barrier and seal of claim 1 further comprising:

an exterior debris shield that at least partially covers the impeller to further protect the system from debris.

4. The environmental barrier and seal of claim 3 wherein:

the exterior debris shield is operatively, removably coupled with the environmental barrier and seal and the impeller to provide maintenance access to the impeller.

5. The environmental barrier and seal of claim 4 further comprising:

a brush seal operatively coupled with a forward end portion of the gear and rotating shaft installation, forward from the primary rotary shaft seal but rearwardly from the impeller to limit engagement between foreign object debris and the primary rotary shaft seal.

6. An environmental barrier and seal for a system incorporating a primary rotary shaft seal associated with a rotating shaft installation, the environmental barrier and seal comprising:

an impeller, operatively, rotatably coupled with a forward end portion of the rotating shaft installation, forward from the primary rotary shaft seal; the impeller having slots positioned to receive incoming air; the impeller being configured to direct incoming air along a pathway to one or more radial exit ports that are positioned along a radial periphery of an impeller housing to blow debris away from the primary rotary shaft seal; and an exterior debris shield that at least partially covers the impeller to further protect the system from debris.

7. The environmental barrier and seal of claim 6 wherein:
the exterior debris shield is operatively, removably coupled with the environmental barrier and seal and the impeller to provide maintenance access to the impeller.

8. The environmental barrier and seal of claim 7 further comprising:
a brush seal operatively coupled with a forward end portion of the gear and rotating shaft installation, forward from the primary rotary shaft seal but rearwardly from the impeller to limit engagement between foreign object debris and the primary rotary shaft seal.

* * * * *